(12) United States Patent
Kappler et al.

(10) Patent No.: US 8,723,934 B2
(45) Date of Patent: May 13, 2014

(54) PROJECTED USER INTERFACE ONTO THE SURFACE OF AN APPLIANCE

(75) Inventors: Jerrod Aaron Kappler, Louisville, KY (US); Roman Roman Vila, Louisville, KY (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 13/169,165

(22) Filed: Jun. 27, 2011

(65) Prior Publication Data

US 2012/0327201 A1    Dec. 27, 2012

(51) Int. Cl.
    *H04N 7/18*    (2006.01)
(52) U.S. Cl.
    USPC .............................. 348/61; 345/440; 396/106
(58) Field of Classification Search
    None
    See application file for complete search history.

(56) References Cited

U.S. PATENT DOCUMENTS

| 4,867,052 | A | * | 9/1989 | Cipelletti | 99/451 |
| 5,999,749 | A | * | 12/1999 | Kobayashi et al. | 396/106 |
| 7,242,388 | B2 | | 7/2007 | Lieberman et al. | |
| 2005/0162422 | A1 | * | 7/2005 | Miyata | 345/440 |
| 2006/0107702 | A1 | * | 5/2006 | Kim | 68/3 R |
| 2008/0033341 | A1 | * | 2/2008 | Grad | 604/20 |
| 2008/0103301 | A1 | * | 5/2008 | Chopra et al. | 544/150 |
| 2009/0269524 | A1 | * | 10/2009 | Zhang et al. | 428/34.1 |
| 2009/0293556 | A1 | * | 12/2009 | Lee et al. | 68/17 R |

FOREIGN PATENT DOCUMENTS

WO    WO 2006/128696 A1    12/2006

* cited by examiner

*Primary Examiner* — Dave Czekaj
*Assistant Examiner* — Md Haque
(74) *Attorney, Agent, or Firm* — Dority & Manning, P.A.

(57) ABSTRACT

A projected display, onto the surface of an appliance, of a user interface that can be utilized to make selections regarding the operation of the appliance is described. Where the surface is part of a door of the appliance, the user interface can be configured for display on the top surface, bottom surface, or both, of the door. Such door can be constructed from a transparent material that can be transformed to provide a reflection of the projected display that is visible to the user.

16 Claims, 3 Drawing Sheets

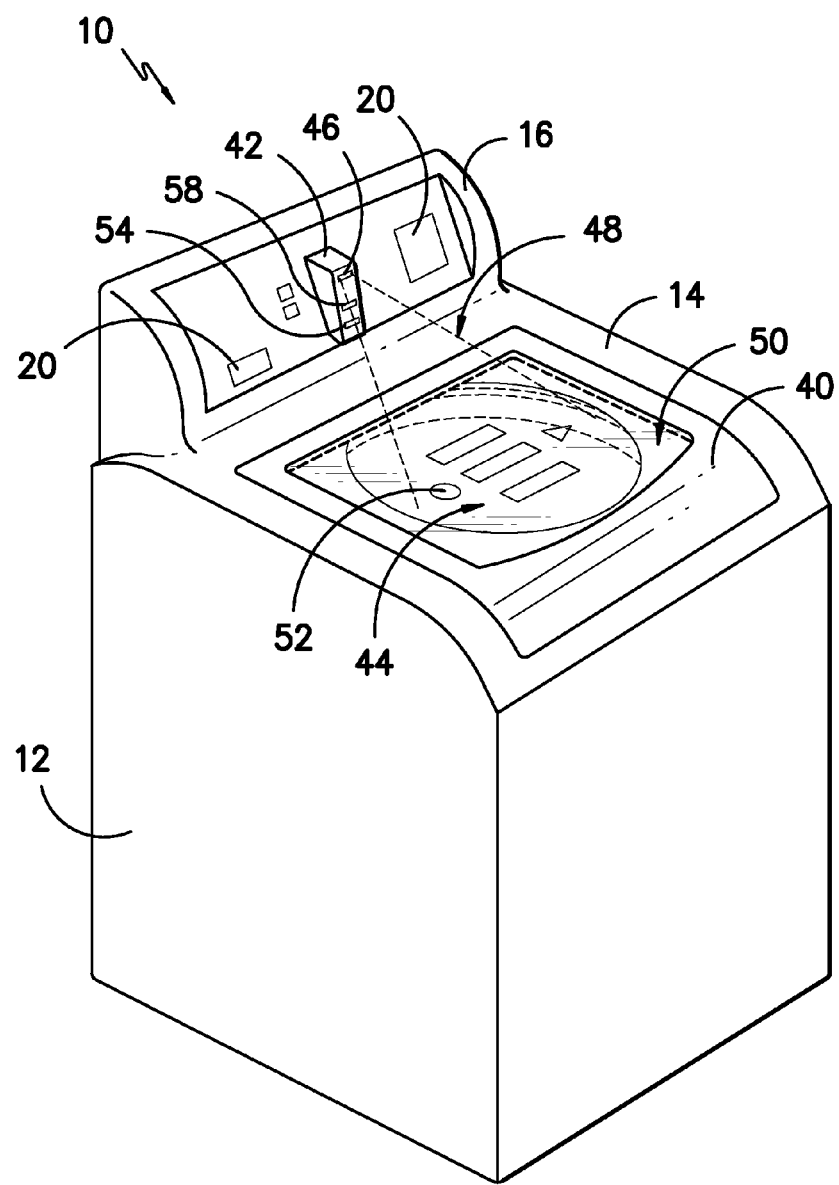
FIG. -1-

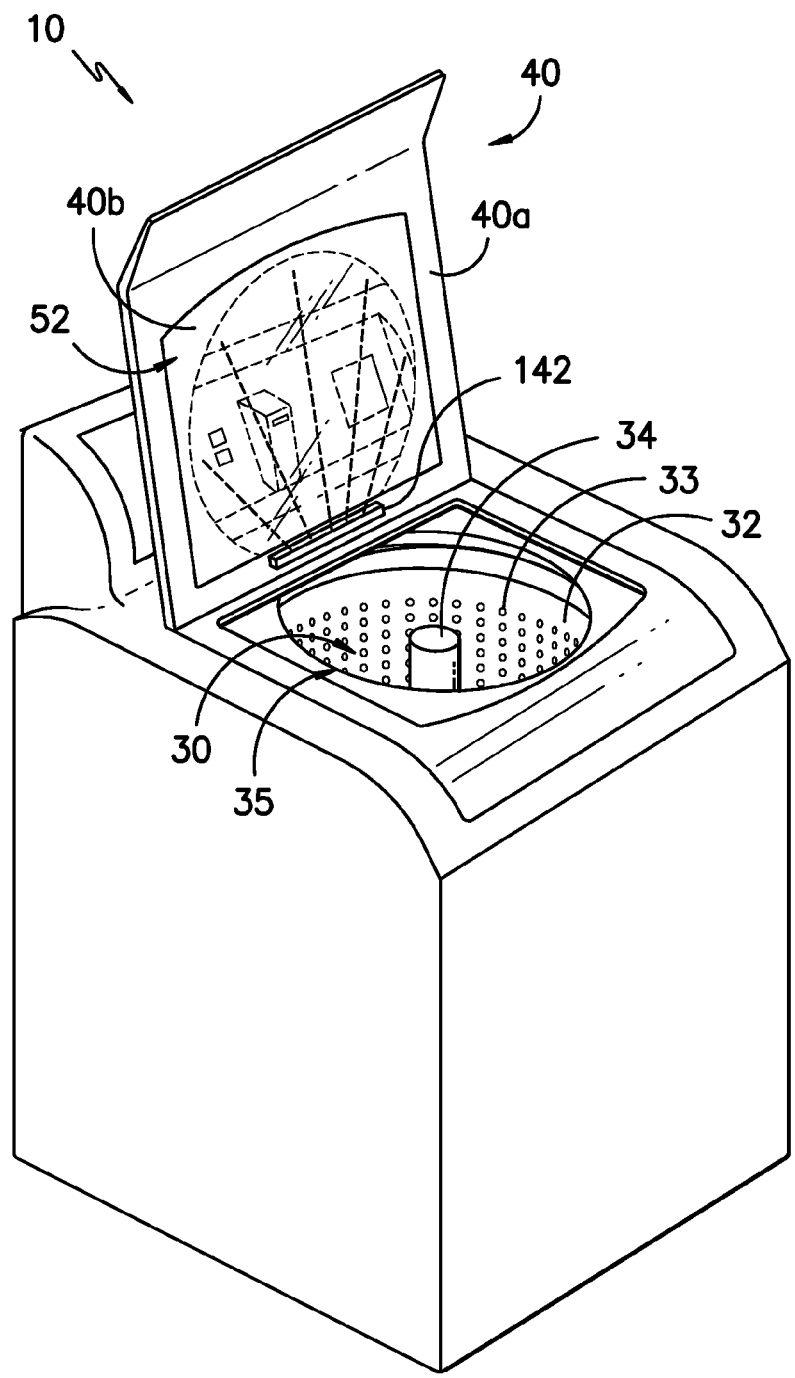
FIG. -2-

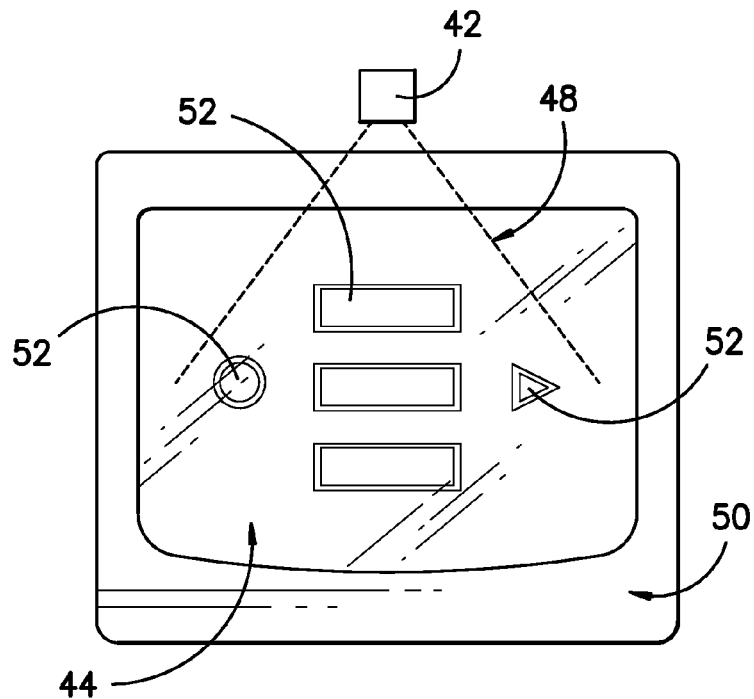
FIG. -3-
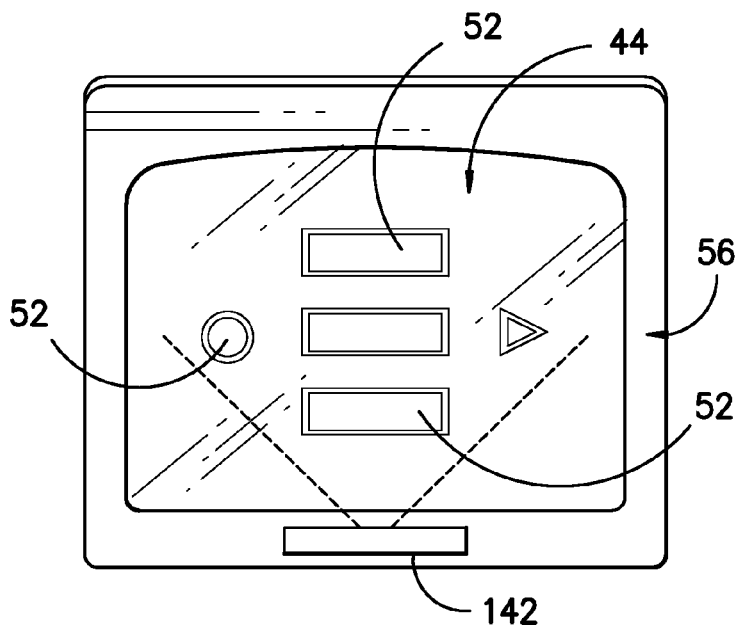
FIG. -4-

PROJECTED USER INTERFACE ONTO THE SURFACE OF AN APPLIANCE

FIELD OF THE INVENTION

The present invention relates to a projected display, onto the surface of an appliance, of a user interface that can be utilized to make selections regarding the operation of the appliance.

BACKGROUND OF THE INVENTION

Modern appliances such as washing machines and clothes dryers frequently provide a variety of operating options for selection by the user. For example, a washing machine may have selectable options such as the wash load size, the amount of time for the wash cycle, article types such as delicates, water temperature, and other options as well. The ability to make selections regarding the operation of the machine can be appealing to customers and influence their decisions regarding product selection.

Conventionally, user selections are provided by controls mounted e.g., on a backsplash or other panel on the appliance. For example, control knobs or switches can be provided for activating various options. In addition, user interfaces in the form of touch screens have been provided whereby the user can select an option by touching the option as it appears on the screen. Touch screens can provide certain advantages over knobs or manual switches in that e.g., a larger variety of options can be made available to the user. For example, multiple options can be made available through the use of multiple pages or displays. The user might select a wash cycle option from a first page or screen that then switches to display another page containing various options for the wash cycle. These options may in turn lead to other displays having yet additional options and so forth. Similarly, options may be provided for the rinse or spin cycles.

Touch screens, however, can increase the expense of manufacturing an appliance. In addition, the space available on e.g., the backsplash of an appliance is limited. Typically, the overall size of a washer or dryer appliance may be selected to meet architectural standards or conventional sizes. In order to maximize the usable capacity of the appliance, the back splash or other panel available for mounting a user interface is relatively small. In addition, the expense of touch screen interfaces can increase as the size of the interface increases.

As a result, the size of the selectable options that are displayed on a touch screen interface are limited by overall size of the display and the number of options to be displayed at any one time. In order to increase the number of options that can be shown on a given page of the display, it may be possible to decrease the display size of the options. However, for some users, such as e.g., those with vision problems, such displays may still seem too small or difficult to view. If too small, it may also be difficult to select one option by touch without also selecting a different, unintended option. The size of the selectable options can be increased to ease viewing. Yet, if the appliance provides multiple options, it may be necessary to provide multiple different pages for display in which the options are nested between pages or accessed through multiple levels of display. Such a configuration can seem confusing or otherwise unappealing to some consumers.

One additional problem with the user interface of an appliance can be its location. For an appliance such as a washing machine with a door mounted on top, the door may open in a manner that blocks access to user controls mounted on the back splash. As such, the user is required to either close the door or reach behind it in order to manipulate the controls.

Accordingly, a user interface for operating an appliance would be useful. More particularly, a user interface that can be provided at sizes larger than conventional appliances and with the ability to increase the number of options available for selection within a given display would be beneficial. Such a user interface that can be configured for access even when a door on the appliance is open would be of additional advantage. The ability to customize the appearance of the user interface, including its size, would also be particularly useful.

BRIEF DESCRIPTION OF THE INVENTION

Aspects and advantages of the invention will be set forth in part in the following description, or may be obvious from the description, or may be learned through practice of the invention.

In one exemplary embodiment, the present invention provides a washing machine that includes a cabinet having a cover that defines an opening. A washing chamber is provided for the receipt of articles to be washed and is accessed through the opening defined by the cover of the cabinet. A door is movably attached to the cabinet. The door is selectively movable between an open position and a closed position whereby the door closes the opening defined by the cabinet. A projector is positioned proximate to the door. The projector is configured for projecting light in the form of a user interface onto the door. A detector is configured for capturing user interruptions of the projected light. The door includes a surface configured for reflecting light from the projector so that the user interface is visible to the user.

In another exemplary aspect, the present invention provides a method of operating a washing machine. The washing machine has a door for opening and closing access to a wash chamber. The method includes the steps of transforming the door of the washing machine from a transparent to a non-transparent door; projecting a user interface onto the non-transparent door of the washing machine, the user interface providing a user with options for operation of the washing machine; sensing the selection of at least one option by the user of the washing machine; and, operating the washing machine according to the option selected by the user.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a perspective view of an exemplary embodiment of a washing machine of the present invention in which the door to the washing machine is closed.

FIG. 2 provides another perspective view of an exemplary embodiment of a washing machine of the present invention in which the door to the washing machine is open.

FIG. 3 is a top view of an exemplary door of a washing machine with dashed lines emulating the operation of a detector mounted e.g., on a backsplash of the appliance.

FIG. 4 is a bottom view of an exemplary door of a washing machine with dashed lines emulating the operation of a detector mounted on the bottom of the door.

DETAILED DESCRIPTION OF THE INVENTION

The present invention relates to a projected display, onto the surface of an appliance, of a user interface that can be utilized to make selections regarding the operation of the appliance. Where the surface is part of a door of the appliance, the user interface can be configured for display on the top surface, bottom surface, or both, of the door. The door can be constructed from an opaque material like metal or a transparent material that can have its light transmitting properties changed to make the surface non-transparent and provide a reflection of the projected display that is visible to the user. Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to but need not be limited to fabrics, textiles, garments (or clothing), and linens. Furthermore, the term "load" or "wash load" refers to the combination of articles that may be washed together in a washing machine and may include a mixture of different or similar articles of different or similar types and kinds of fabrics, textiles, garments and linens within a particular laundering process.

FIG. 1 is a perspective view of an exemplary vertical axis washing machine 10 that includes a cabinet 12 having a cover 14 with door 40 in a closed position. FIG. 2 provides another perspective view in which door 40 is in an open position. A backsplash 16 extends from cover 14, and a variety of appliance control input selectors 20 are coupled to backsplash 16. Input selectors 20 can provide e.g., features in addition to the projected user interface 44 of the present invention or for controlling such interface. Alternatively, in another exemplary embodiment of the invention, input selectors 20 may be eliminated completely as all controls are provided with the projected user interface 44.

A wash chamber 30 is located within cabinet 12. Wash chamber 30 is accessed through opening 35, which is used to insert or remove articles of a wash load. Wash basket 32 is rotatably mounted within wash chamber 30. Basket 32 includes a plurality of apertures or perforations 33 therein to facilitate fluid communication through wash basket 32. As such, perforations 33 allow water to be e.g., removed from wash basket 32 by draining as part of a wash, spin, or rinse cycle. An agitator, impeller, or oscillatory basket mechanism 34 is disposed in basket 32 to impart an oscillatory motion to articles and liquid in basket 32. A motor (not shown) provides for the movement of agitator 34. Wash chamber 30 is also in fluid communication with one or more pumps and/or drains for the removal of water, such as grey water, from chamber 30 such as e.g., after a wash or rinse cycle.

Washing machine 10 is controlled by a processing device or other controller, such as a microprocessor (not shown), according to user preference via manipulation of control input selectors 20 mounted on backsplash 16 and/or the controls provided by a projected user interface as will be further described. As used herein, processing device may refer to one or more microprocessors or semiconductors devices and is not restricted necessarily to a single element. The processing device can be programmed to operate washing machine 10 according to features desired by the consumer or options selected by the consumer.

As illustrated in FIG. 1, agitator 34 is oriented to rotate about a vertical axis. It is contemplated, however, that the benefits of the present invention can also apply to horizontal axis washing machines as well. More specifically, the washing machine 10 of FIGS. 1 and 2 is provided by way of example only. Using the teachings disclosed herein, one of ordinary skill in the art will understand the present invention may be used with washing machines of various other configurations in both residential and commercial applications. Additionally, the present invention may also be used with other appliances such as e.g., a clothes dryer.

Washing machine 10 is equipped with a console 42 that is mounted e.g., on backsplash 16 and proximate to door 40 as shown in FIGS. 1 and 2. Console 42 contains various elements that assist with the utilization of a user interface 44 that is projected onto door 40. More specifically, console 42 includes a projector 46 that projects light (as symbolized by dashed lines 48 in FIGS. 1 and 3) creating the image of a user interface 44 on the top surface 50 of door 40. For example, projector 46 creates the appearance of various options 52 that may be selected by the user for operation of the washing machine. Such options might provide e.g., different selections for the wash, rinse, and or spin cycles of a washing machine as are provided e.g., on conventional machines using controls or an interface mounted in backsplash 16.

Because user interface 44 is projected onto top surface 50, the size of the various options 52 can be much larger in appearance than would be available on a conventional display provided on a backsplash 16. More specifically, unlike the smaller backsplash 16, the top surface 50 of door 40 provides significantly more surface area onto which user interface 44 may be displayed. As a result, the display of various selections or options 52 can be made much larger and more options 52 can be displayed at a single time. For example, top surface 50 may be large enough to display all user selectable options available at one time rather than nesting over various pages of displays. Ample space can be allowed between options 52 so that the user is less likely to accidentally select an intended option. Top surface 50 could even allow for the projection of an alphanumeric keyboard. The displayed size of user interface 44 can also be adjustable so that the user can e.g., selected different sizes according to preference. The arrangement of items in user interface 44 can also be adjustable so that the user can customize the appearance of the display as desired.

Various configurations may be used for projector 46. For example, projector 46 may include a laser for creating user interface 44. Light from the laser may be diffracted, reflected, and/or passed through a lens in order to create the image of user interface 44. Other configurations may be used as well.

Console 42 also contains a detector 54 that is configured for capturing user interruptions of light from projector 46. More specifically, a user makes selections on interface 44 by touching an option 52 projected onto top surface 50 of door 40 or by placing an object (such as a finger) in close proximity to the surface 50 near an option 52. Detector 54 captures or determines the location at which the interruption occurred. For example, detector 54 may include a camera that captures the "x and y" coordinates, or pixels, at which the interruption occurs in the image of user interface 44.

Once this location of an interruption is determined by detector 54, the detector (i.e. camera) can send the parameters of the location to a digital signal processing device. The digital signal processing (DSP) device analyzes the location of the interruption to determine which option 52 was selected by the user. For example, the DSP compares the location parameters with values stored in a memory device such as an Electrically Erasable Programmable Read-Only Memory (EEPROM). The EEPROM contains a file with the location parameters as well as an identification or correlation of the option 52 to which such location parameters are assigned. For example, if the user selects an option 52 for a warm wash cycle temperature, the detector transmits the location parameter for that selection to the DSP. In turn, the DSP compares those location parameters with the correlation of such parameters in the EEPROM and determine that the warm wash cycle has been selected. The DSP then transmits an appropriate instruction to operate the wash cycle using warm water. Such instruction may be transmitted e.g., to another processing device of may go directly to a valve controlling the water temperature or water flow. On the other hand, if the DSP does not find a correlation with the location selected by the user from user interface 44, then the DSP can send e.g., and error message to the user that is displayed on user interface 44 by projector 46.

FIGS. 1 and 3 provide top views where projector 46 is used to display a user interface 44 onto the top surface 50 of a door 40 in the closed position. However, the present invention may also be used to display a user interface when door 40 is in the open position shown in FIG. 2. More specifically, a console 142 may be mounted onto bottom surface 56 of door 40. As with console 42, console 142 can be equipped with a projector and detector to operate as previously described. As such, a user can access user interface 44 even when door 40 is in the open position. As an additional feature, washing machine 10 can be provided with a sensor or other device for determining when door 40 is in the open position. When detected in the open position, projector 46 can be adjusted to automatically display user interface 44 for a set period of time or until door 40 is closed. It should also be understood that washing machine 10 could be provided with console 42 or console 142, or both. Accordingly, washing machine 10 could be equipped to provide for a display of user interface 44 when door 40 is in the closed position or the open position, or both.

As shown in FIG. 2, a portion of door 40 is made up of a transparent material. More specifically, door 40 can be constructed from a frame 40a and a transparent window 40b. For certain consumers, transparent window 40b is an attractive feature that allows the user to see into the chamber 30 of washing machine 10 during use. In order to allow for the reflected display of the user interface 44 from window 40b, transparent window 40b includes a dye that is configured for reflecting light from the projector so that the user interface 44 is visible to the user.

By way of example, window 40b can include a photochromic dye. In general, photochromic dyes undergo a reversible, photochemical reaction upon exposure to light of certain wavelengths. Under visible light, the dye allows window 40b to remain clear. However, upon exposure to an ultraviolet light (UV) source, the photochromic dye turns window 40b completely or at least partially opaque whereby light provided by projector 46 may be reflected as user interface 44. Accordingly, console 42 (FIG. 1) is provided with a UV light source 58 for projecting UV light to act upon a photochromic dye that transforms window 40b from transparent to at least partially opaque, and thereby makes visible the projected user interface 44. Similarly, console 142 may also be provided with a UV light source as well so that user interface 44 will be visible when in the open position.

Additionally, the projected user interface can be flexible in the configuration of the machine selections as presented to the consumer. Multiple layouts or configurations of the selections can be arranged by way of pre-set options selectable by the user or by way of the user arranging the selections "buttons" or icons manually. This allows for the most user flexibility and convenience. For instance, the user may want and would be able to relocate the performance modifier selections to be on the right side of the user interface displayed onto the door where the pre-set or default projected locations were on the left.

While the present invention has been shown in the figures with a display onto transparent window 40b, using the teachings disclosed herein, it will also be understood that projection onto other surfaces of an appliance could also be utilized. For example, a projector could also be used to provide a display of user interface 44 onto a door lacking a transparent window 40—such as a door constructed from metal or other opaque materials. In addition, a display could be provided onto other surfaces of an appliance that do not function as a door. For example, although shown with a vertical axis washing machine, a projector could also be used to provide a projected display onto the top surface of a horizontal axis washing machine, dryer, or other appliances as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine, comprising:
   a cabinet including a cover that defines an opening;
   a washing chamber for the receipt of articles to be washed, said washing chamber accessed through the opening defined by the cover of said cabinet;
   a door that is movably attached to said cabinet, said door being selectively movable between an open position and a closed position whereby said door closes the opening defined by said cabinet;
   a projector positioned proximate to said door, said projector configured for projecting light in the form of a user interface onto said door;
   a detector configured for capturing user interruptions of the projected light; and,
   a UV light source positioned proximate to said door and configured to project UV light onto said door when said UV light source is activated;
   wherein said door further comprises a viewing surface configured for reflecting the light from said projector so that the user interface is visible to the user and wherein the light transmitting characteristics of said viewing surface can be changed and wherein said door is substantially transparent until activation of said UV light source to cause said door to become non-transparent such that the user interface becomes visible and is reflected to the user.

2. A washing machine as in claim 1, wherein said projector also comprises said UV light source.

3. A washing machine as in claim 1, wherein said viewing surface contains a photochromic dye.

4. A washing machine as in claim 1, wherein said viewing surface contains a photochromic coating.

5. A washing machine as in claim 1, wherein said door has a top surface and a bottom surface, and wherein said projector is positioned to display the user interface on the bottom surface when said door is in an open position.

6. A washing machine as in claim 1, wherein said projector is positioned to display the user interface when said door is in a closed position.

7. A washing machine as in claim 1, further comprising:
a digital signal processing device; and,
wherein said detector comprises a camera connected with said digital signal processing device such that said digital signal processing device can associate the user interruptions with selections provided in the user interface.

8. A washing machine as in claim 1, wherein the size of the user interface provided by the projector is adjustable by the user.

9. A washing machine as in claim 1, wherein the locations of selections in the user interface provided by the projector are adjustable by the user.

10. A method of operating a washing machine, the washing machine having a door for opening and closing access to a wash chamber, the method comprising the steps of:
transforming the door of the washing machine from a transparent to a non-transparent door;
projecting a user interface onto the non-transparent door of the washing machine, the user interface providing a user with options for operation of the washing, machine;
sensing the selection of at least one option by the user of the washing machine; and,
operating the washing machine according to the option selected by the user;
wherein said transforming step comprises activating a UV light source that causes said door of the washing machine to become non-transparent such that the user interface is visible to a user.

11. A method of operating a washing machine as in claim 10, wherein said transforming step comprises activating a light sensitive dye.

12. A method of operating a washing machine as in claim 10, wherein said transforming step comprises activating a photochromic material.

13. A method of operating a washing machine as in claim 10, wherein said sensing step comprises determining the position at which the user interrupted light from said projecting step and correlating that position with the user interface so as to ascertain the option selected by the user.

14. A method of operating a washing machine as in claim 10, wherein the door of the washing machine has a top surface and a bottom surface, and wherein said projecting step further comprises projecting the user interface on the top surface of the door.

15. A method of operating a washing machine as in claim 10, wherein the door of the washing machine has a top surface and a bottom surface, and wherein said projecting step further comprises projecting the user interface onto the bottom surface of the door.

16. A method of operating a washing machine as in claim 10, wherein the door of the washing machine has a top surface and a bottom surface, further comprising the step of mounting the UV light source onto the bottom surface of the door.

* * * * *